United States Patent
Kim

(10) Patent No.: US 12,556,385 B2
(45) Date of Patent: Feb. 17, 2026

(54) DATA PROCESSING METHOD OF TRUST EXECUTION ENVIRONMENT USING SMART CONTRACT

(71) Applicant: AvChain Inc., Seoul (KR)

(72) Inventor: Hyeong-Joon Kim, Seoul (KR)

(73) Assignee: AvChain Inc., Seoul (KR)

( * ) Notice: Subject to any disclaimer, the term of this patent is extended or adjusted under 35 U.S.C. 154(b) by 176 days.

(21) Appl. No.: 18/505,104

(22) Filed: Nov. 8, 2023

(65) Prior Publication Data

US 2024/0106642 A1    Mar. 28, 2024

Related U.S. Application Data

(63) Continuation of application No. PCT/KR2022/006652, filed on May 10, 2022.

(30) Foreign Application Priority Data

May 10, 2021   (KR) .......................... 10-2021-0060045
May 10, 2022   (KR) .......................... 10-2022-0057152

(51) Int. Cl.
*H04L 9/08* (2006.01)
*G06F 21/52* (2013.01)

(52) U.S. Cl.
CPC .............. *H04L 9/088* (2013.01); *G06F 21/52* (2013.01)

(58) Field of Classification Search
CPC .................................. H04L 9/088; G06F 21/52
See application file for complete search history.

(56) References Cited

U.S. PATENT DOCUMENTS

| | | | |
|---|---|---|---|
| 2018/0330125 A1 | 11/2018 | Gray | |
| 2020/0036519 A1* | 1/2020 | Bitauld | H04L 9/0897 |
| 2020/0184093 A1* | 6/2020 | Liu | G06F 16/24552 |
| 2020/0320417 A1* | 10/2020 | Corning | G06F 21/85 |
| 2020/0336297 A1 | 10/2020 | Zhuo | |
| 2020/0342092 A1* | 10/2020 | Wei | G06F 21/6218 |
| 2021/0064784 A1 | 3/2021 | Wei et al. | |
| 2021/0174634 A1* | 6/2021 | Purohit | G06F 8/61 |
| 2022/0189589 A1* | 6/2022 | Ogawa | G16H 50/30 |

FOREIGN PATENT DOCUMENTS

| | | | |
|---|---|---|---|
| JP | 6638024 B2 | | 1/2020 |
| KR | 10-2019-00895506 A | | 7/2019 |

* cited by examiner

*Primary Examiner* — Henry Tsang
(74) *Attorney, Agent, or Firm* — NKL LAW; Jae Youn Kim

(57) ABSTRACT

A data processing method of a trusted execution environment using a smart contract of the present invention comprises the steps of: a data processing platform server generating, according to a smart contract distributed on a blockchain, a trusted execution environment including a data processing code and an encryption key in response to a data processing request received from a client device; the trusted execution environment acquiring, from a data-owned device, first data encrypted by the encryption key; the trusted execution environment decoding the first data; the trusted execution environment generating the result of data processing by processing the decoded first data according to the data processing code; the trusted execution environment providing the result of data processing to the client device; and the trusted execution environment being self-destroyed according to the smart contract.

14 Claims, 3 Drawing Sheets

DATA PROCESSING METHOD OF TRUST EXECUTION ENVIRONMENT USING SMART CONTRACT

TECHNICAL FIELD

The present invention relates to a data processing method in a trusted execution environment using a smart contract.

BACKGROUND ART

Blockchain: Blockchain is a decentralized, distributed system. Decentralization means that there is no single centralized entity to perform functions, but rather many participants working together. Basically, blockchain networks are composed of peer-to-peer (P2P) networks and use a consensus algorithm to generate blocks through a common process. The use of hashes is at the core of the blockchains, and the fact that multiple participants are performing the same processing on the same data is combined with the hashes to prevent data tampering.

A smart contract is a set of programming codes that allow the enforcement of the contract to happen automatically, based on a blockchain that deals with the part of assets and trust. The content of the code written by the developer exists in one block on the blockchain, and users can access the address of the smart contract to execute the code.

The reason why it is called a smart contract is that the code content of the smart contract is also included in block information, just like the contents of general transactions, so it is impossible to manipulate the code; and the program works according to the coded content, so it is suitable for working with fixed content such as the contract.

Smart contracts written in Ethereum use the Solidity language and run on top of the EVM. A virtual machine for professional execution of Ethereum smart contracts is called an Ethereum virtual machine (EVM), and the Ethereum smart contracts are written in languages such as Solidity and Viper, and are widely applied and used in the field of the blockchain.

Several monitoring web applications exist as a way to provide information about the smart contracts in an Ethereum network, the most representative of which are Etherescan, which is provided by Ethereum itself, Alvio, which provides information in a visual form, and Remix, which is Solidity IDE.

DISCLOSURE

Technical Problem

The technical problem of the present invention is to provide a data processing method in a trusted execution environment using a smart contract that is capable of blocking data viewing by a data processing entity, preventing data leakage to the outside, and protecting the privacy of the entity that provided the data.

Technical Solution

A data processing method in a trusted execution environment includes: generating, by a data processing platform server, a trusted execution environment containing a data processing code and an encryption key in response to a data processing request received from a client device according to a smart contract distributed on the blockchain; acquiring, by the trusted execution environment, first data encrypted by an encryption key from a device for data storage; decrypting, by the trusted execution environment, the first data; processing, by the trusted execution environment, the decrypted first data according to the data processing code to produce a data processing result; providing, by the trusted execution environment, the data processing result to the client device; and causing the trusted execution environment to be self-destroyed according to the smart contract.

According to the embodiment, said generating the trusted execution environment may include: generating a raw trusted execution environment with no arbitrary data processing code and no encryption key generated; and generating, based on the raw trusted execution environment, the trusted execution environment containing the data processing code and the encryption key corresponding to the data processing request.

According to the embodiment, said generating the raw trusted execution environment may include: generating a first image executable file of the raw trusted execution environment, generating a first hash value for the first image executable file, and generating a transaction including the first hash value to record it on the blockchain.

According to the embodiment, said generating the trusted execution environment containing the data processing code and the encryption key corresponding to the data processing request may include: generating a second image executable file of the trusted execution environment, generating a second hash value for the second image executable file, and generating a transaction containing the second hash value to record it on the blockchain.

According to the embodiment, the method may further include: after said providing the data processing result to the client device, verifying, by the trusted execution environment, that the enforcement of the smart contract has been completed.

According to the embodiment, the trusted execution environment may maintain its validity only as long as the smart contract lasts.

According to the embodiment, the trusted execution environment may be a virtual execution environment.

According to the embodiment, at least one trusted execution environment may be generated to enforce the smart contract in the data processing platform server.

According to the embodiment, the encryption key may be an asymmetric key comprised of a pair of a private key and a public key of the trusted execution environment.

According to the embodiment, the encrypted first data may be one that is encrypted with the public key of the trusted execution environment.

According to the embodiment, said providing to the client device may include: providing the data processing result to the client device by encrypting the data processing result using a public key of the client device and returning the data processing result to the blockchain.

According to the embodiment, said causing to be self-destroyed according to the smart contract may include: executing the self-erasure instruction; and causing the trusted execution environment including the data processing code and the decrypted first data to be self-destroyed.

According to the embodiment, the executing the self-erasure instruction may include: executing the self-erasure instruction, generating a flag indicating the execution of the self-erasure instruction, and then generating a transaction including the flag to record it on the blockchain.

Advantageous Effects

According to the data processing method in the trusted execution environment using a smart contract according to the embodiment of the present invention, the trusted execution environment is allowed to be self-destroyed and the stored data is also simultaneously deleted when the smart contract is terminated, thereby preventing the collected data from being leaked to the outside and principally blocking the viewing of the data by the entity of operating the data processing platform server to protect the privacy of the entity of the data.

In addition, according to the data processing method in the trusted execution environment using a smart contract according to the embodiment of the present invention, a plurality of smart contracts may be executed simultaneously using the trusted execution environment that is executed independently for each smart contract.

Moreover, according to the data processing method in a trusted execution environment using a smart contract according to the embodiment of the present invention, by recording a flag of the self-erasure instruction on the blockchain, it is possible to ensure that the trusted execution environment provided with the data is reliably removed and that the data is securely deleted without leakage to the outside.

Furthermore, according to the data processing method in the trusted execution environment using a smart contract according to the embodiment of the present invention, the client device may obtain the desired data processing result without directly collecting or processing the data required for the data processing, and the privacy of the entity that provided the data is securely protected because the data required for the data processing is not disclosed to the client device.

BEST MODE

Figure 1:
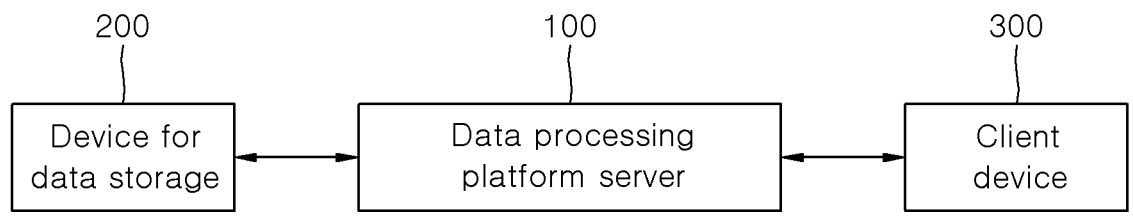
FIG. 1 is a schematic block diagram of a data processing system according to an embodiment of the present invention.

The advantages and features of the present invention, and methods of achieving them will be apparent from the embodiments described in detail below in conjunction with the accompanying drawings. However, the invention is not limited to the embodiments disclosed herein and may be implemented in many different forms, and these embodiments are provided to make the disclosure of the invention complete and to fully inform one of ordinary skill in the art to which the invention belongs of the scope of the present invention, and the invention is defined only by the scope of the claims.

The terminology used herein is intended to describe the embodiments and is not intended to limit the invention. Throughout this specification, the singular includes the plural unless otherwise specifically indicated. As used in the specification, the words "comprises" and/or "comprising" do not exclude the presence or addition of one or more other components in addition to the recited components. Throughout this specification, the same reference numerals refer to the same components, and "and/or" includes any and all combinations of one or more of the specified components. Although "a first", "a second", etc. are used to describe various components, these components are not limited by these terms. These terms are used only to distinguish one component from another. Therefore, it is understood that that a first component referred to below may be a second component within the technical idea of the present disclosure.

Unless otherwise defined, all of the terms used in the embodiments of the present invention (including technical and scientific terms) are intended to have the meanings that are generally understood by those skilled in the art. In addition, unless specifically defined herein, terms defined in the common dictionary are not to be construed as ideal or excessive.

FIG. 1 is a schematic block diagram of a data processing system according to an embodiment of the present invention.

Referring to FIG. 1, a data processing system according to an embodiment of the present invention includes a data processing platform server 100, a device for data storage 200, and a client device 300.

The data processing platform server 100 may be a network addressable device that hosts online networks, and may provide a data processing platform in which data is shared online to the device for data storage 200 and the client device 300. The data processing platform server 100 may perform a series of processes such as creating, distributing, enforcing, and terminating smart contracts on the blockchain through the data processing platform.

The data processing platform server 100 may generate a smart contract for data processing and distribute it to the blockchain. The smart contract for data processing may be an electronic contract that is automatically signed on the blockchain when the preset conditions are satisfied, and the data processing platform server 100 may generate and distribute to the blockchain the smart contract in which a set of contract contents necessary for the data processing, such as data collection, analysis, and result derivation, is recorded.

A block on the blockchain has a record of the smart contract, allowing the smart contract to be executed on the blockchain. For example, the blockchain may be implemented as an Ethereum blockchain, and smart contracts written in Solidity, Viper, and so on may be distributed to the blockchain through an Ethereum virtual machine (EVM). In addition, all transactions on the blockchain may be hashed with SHA-256 to store hash values, and the hash values may be stored in blocks on the blockchain to protect the privacy of individuals and prevent overloading.

The smart contract distributed by the data processing platform server 100 may be automatically concluded when a data processing request that is consistent with a preset regulation is received from the client device 300, and the contract may be terminated when a data processing result is returned in response to the data processing request.

Here, the data processing request relates to a request for processing data that can be processed by the data processing platform server 100, and a data processing code required to process the data may be provided by the client device 300 or may be generated by the data processing platform server 100.

For example, when the smart contract is concluded between the data processing platform server 100 and the client device 300, the data processing platform server 100 may acquire the data processing code provided by the client device 300 to the blockchain and use it to process the data.

For example, when the smart contract is concluded between the data processing platform server 100 and the client device 300, the data processing platform server 100 may independently determine a processing model required for the data processing request, and then read the determined processing model to use it for the data processing.

The data processing platform operated by the data processing platform server 100 generates a trusted execution environment (TEE) for data processing when the smart contract is signed. In other words, when the data processing platform server 100 receives a data processing request from the client device 300, it generates a trusted execution environment containing a data processing code and an encryption key in response to the data processing request.

Specifically, the data processing platform server 100 may generate a raw trusted execution environment that is the source of the creation of the trusted execution environment. The raw trusted execution environment is a virtual execution environment in which arbitrary data processing code and encryption key have been not generated.

According to an embodiment, the data processing platform server 100 may generate a hash value for an image executable file when the raw trusted execution environment implemented by the image executable file is generated, and generate a transaction including the hash value and record it on the blockchain. Accordingly, the data processing platform server 100 may disclose to the outside that the raw trusted execution environment has been generated for generating the trusted execution environment.

The raw trusted execution environment is a secure execution environment provided by an independent secure area, which may be generated by an image executable file for the implementation of a virtualized execution environment. However, it is not limited this; the raw trusted execution environment may be implemented by either a hardware-based solution or a hardware/software-based solution.

The data processing platform server 100 may generate a trusted execution environment that includes a data processing code and an encryption key corresponding to the data processing request based on the raw trusted execution environment. The trusted execution environment is a secure execution environment provided by an independent secure area, just like the raw execution environment, and may be generated by an image executable file for the implementation of a virtualized execution environment.

The cryptographic key in the trusted execution environment is eternally owned accounts (EOA), which may use a mechanism based on public-private key pairs to represent the uniqueness of blockchain participants. The trusted execution environment generates a 256-bit random number when generating an account address and sets it as a private key, wherein the 256-bit random number may be applied to the private key using an elliptic cryptography algorithm to extract a unique public key. The public key of the trusted execution environment generated by this process is disclosed to the outside through the blockchain, and the data encrypted with the public key is set to be restored only with the private key of the trusted execution environment.

According to an embodiment, the data processing platform server 100 may generate a hash value for the image executable file when the trusted execution environment implemented by the image executable file is generated, and may generate a transaction including the hash value and record it on the blockchain. Accordingly, the data processing platform server 100 may externally disclose that the trusted execution environment corresponding to the smart contract has been securely executed without being tampered with or forged.

The trusted execution environment may request data collection from the device for data storage 200 to perform data processing corresponding to the data processing code. For this purpose, the trusted execution environment may generate a transaction requesting data from the device for data storage 200 and record it on the blockchain. In this case, the trusted execution environment may distribute a separate smart contract for data collection to the blockchain, or it may generate a transaction only for the announcement of the data collection and record it on the blockchain.

According to the embodiment, upon receiving that a data collection target is designated from the client devices 300 when the smart contract is concluded, the trusted execution environment may request the data collection target to transmit data. In other words, the trusted execution environment may designate an account of a certain device for data storage 200 and record a transaction requesting the designated device for data storage 200 to transmit data on the blockchain.

According to another embodiment, the trusted execution environment may request any device for data storage 200 to transmit data by recording a transaction including types, contents, and the like of data required for data processing on the blockchain. That is, the trusted execution environment may disclose a data collecting condition without specifying an entity from which data is to be collected, so that data may be collected from any device for data storages 200 having data that satisfies the data collecting condition.

The trusted execution environment may perform the data processing based on the data collected from the device for data storage 200. Since the inbound and outbound rules are set in the trusted execution environment, the trusted execution environment receives only data in the format that corresponds to the data processing code and returns the data processing result to the outside in a predetermined format.

The trusted execution environment may perform data processing if the data collected from the device for data storages 200 complies with the criteria required for the data processing. Since the data collected from the device for data storage 200 is encrypted with the public key of the trusted execution environment, the trusted execution environment may decrypt the data the data with the private key and process the data according to the data processing code.

After the processing of the data is completed, the trusted execution environment may provide a data processing result to the client device 300. The trusted execution environment may acquire the public key provided by the client device 300 at the time of concluding the smart contract, and may encrypt the data processing result with the public key of the client device 300 and return it to the blockchain.

The smart contract between the data processing platform server 100 and the client device 300 may be automatically concluded when a data processing request that is consistent with the preset condition is entered, and the contract may be terminated when the data processing result corresponding to the data processing request is returned. Therefore, when the trusted execution environment encrypts the data processing result, generates the transaction including the encrypted data processing result, and records the transaction in a block of the blockchain, these mean that the enforcement of the smart contract is completed.

Meanwhile, the trusted execution environment has a temporary status, which maintains its validity only as long as the smart contract lasts. in other words, the trusted execution environment is generated only when the smart contract distributed on the blockchain is established and the data processing request is received from the client device 300, and the trusted execution environment is caused to be self-destroyed when the data processing that is consistent with the content of the smart contract is completed or the smart contract is terminated due to other circumstances.

Causing the Trusted Execution Environment to be self-destroyed means that an environment that build the trusted execution environment is initialized, which means that a set of data related to the Trusted Execution Environment is deleted. Therefore, the data received from the device for data storage 200 for the data processing by the trusted execution environment is deleted together as the trusted execution environment is self-destroyed.

In a case where the data processing platform server 100 stores the data even after the data processing is completed, there is a risk that the data may be leaked by an external malicious attack and may be viewed by the operator of the data processing platform server 100.

In contrast, the data processing platform server 100 according to an embodiment of the present invention stores the data received from the device for data storage 200 only during the period when the smart contract is being maintained, and allows the trusted execution environment to be self-destroyed and the stored data to be also deleted when the smart contract is terminated. Accordingly, the data processing platform server 100 may prevent the data from being leaked to the outside and prevent the data from being viewed by the entity operating the data processing platform server 100, thereby protecting the privacy of the entity that provided the data.

According to an embodiment, the trusted execution environment may record a flag on the blockchain indicating that a self-destroy instruction was executed. When the self-destroy instruction is executed, a flag is generated that cannot be an execution environment may generate a transaction containing the corresponding flag and record it on the blockchain, and then begin a self-destroy process.

The trusted execution environments generated for data processing may be virtual execution environments, at least one of which is generated by the data processing platform server 100 to enforce a smart contract, and may be independently generated, self-destroyed, and initialized depending on whether or not the contract is established and enforced. In this way, the data processing platform server 100 may execute a plurality of smart contracts simultaneously by using a trusted execution environment in which each smart contract is executed independently.

The device for data storage 200 may be a communication device that is capable of accessing the data processing platform, store data necessary for data processing, and run applications necessary for managing the stored data.

For example, when the data processing platform server 100 requests a user's medical records for data processing, the device for data storage 200 may provide data about the user's medical records, health status, etc. to the data processing platform server 100 through a health management application.

The device for data storage 200 may refer to an individual's device, but may also refer to a data repository that stores data from multiple entities. For example, the device for data storage 200 may be at least one of, but not limited to, a personal computer (PC), a smartphone, a tablet PC, a mobile internet device (MID), an internet tablet, an internet of things (IoT) device, an internet of everything (IoE) device, a desktop computer, a laptop computer, a workstation computer, a wireless broadband internet (Wibro) device, and a personal digital assistant (PDA), and may be a database that stores data from multiple entities.

The device for data storage 200 may run an application that scans the blockchain and verify a data request from the trusted execution environment by checking the transactions recorded on the blockchain. For example, the device for data storage 200 may verify the data request from the trusted execution environment recorded on the blockchain using applications such as Etherescan and Remix.

The device for data storage 200 may acquire from the blockchain the encryption key recorded together with the data request from the trusted execution environment and encrypt the stored data using the encryption key. In other words, the device for data storage 200 may generate a 256-bit hash value for the data using the public key of the trusted execution environment.

The device for data storage 200 may provide the data encrypted with the hash value to the trusted execution environment running on the data processing platform server 100. The device for data storage 200 may transmit the encrypted data to the trusted execution environment through the data processing platform, but it may also generate a transaction including a hash value of the encrypted data and record it on the blockchain to ensure authenticity.

The device for data storage 200 may acquire coins from the blockchain as a reward for providing the data to the data processing platform server 100, and the quantity of the coins that can be acquired may be set by the trusted execution environment.

Since the entity of the device for data storage 200 provides information related to the user's privacy, such as medical records and health status information, to the data processing platform server 100, the entity may be concerned about the disclosure of the personal information. To address these concerns, the device for data storage 200 may scan the blockchain through an application to check a flag of self-destroy instruction recorded on the blockchain.

If the flag of the self-destroy instruction for the trusted execution environment is scanned by the device for data storage 200, it may ensure that the trusted execution environment and the data have been securely deleted.

The client device 300 is a device that concludes a smart contract with the data processing platform server 100 by generating a data processing request consistent with the smart contract and providing a transaction including the data processing request to the blockchain. For example, the client device 300 may be at least one of, but not limited to, a personal computer (PC), a smartphone, a tablet PC, a mobile internet device (MID), an internet tablet, an internet of things (IoT) device, an internet of everything (IoE) device, a desktop computer, a laptop computer, a workstation computer, a wireless broadband internet (Wibro) device, and a personal digital assistant (PDA).

The client device 300 may provide the data processing code required for the data processing as a transaction, along with the data processing request at the time of concluding the smart contract, and may also provide the account of a certain device for data storage 200 as a transaction to designate an entity from which data is to be collect. In addition, the client device 300 may provide the public key of the client device 300 as a transaction along with the data processing request at the time of concluding the smart contract in order to receive the encrypted data processing result.

The client device 300 may acquire a data processing result from the blockchain as the smart contract is enforced, and may acquire the data processing result that is consistent with the data processing request by decrypting the encrypted data processing result with the private key.

In this way, the client device 300 may obtain the desired result without directly collecting or processing the data necessary for the data processing. In addition, since the data necessary for the data processing is not disclosed to the entity of the client device 300, the privacy of the entity that provided the data may be securely protected.

Figure 2:
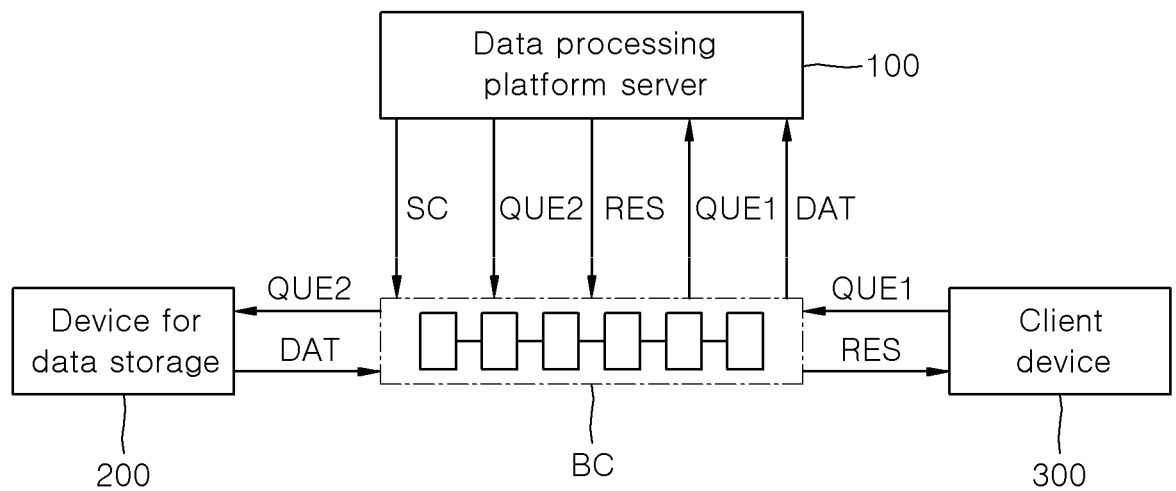
FIG. 2 is a diagram to illustrate a data processing method in a trusted execution environment using a smart contract according to an embodiment of the present invention.

FIG. 2 is a diagram to illustrate a data processing method in a trusted execution environment using a smart contract according to an embodiment of the present invention.

Referring to FIG. 2, the data processing platform server 100 may generate a smart contract SC for a data processing and distribute it to the blockchain BC, and the smart contract SC may be recorded in a block of the blockchain BC and executed on the blockchain BC. Here, the smart contract SC is automatically concluded when a transaction including a data processing request QUE1 consistent with a preset regulation from the client device 300 is provided to the blockchain BC, and is terminated when a data processing result consistent with the data processing request QUE1 is returned.

The client device 300 may provide the data processing request QUE1 consistent with the smart contract SC to the blockchain BC in order to acquire the data processing result.

When the smart contract SC is concluded between the data processing platform server 100 and the client device 300, the data processing platform server 100 generates a trusted execution environment containing a data processing code and an encryption key in response to the data processing request QUE1. Here, the data processing code may mean a data processing model provided to the blockchain by the client device 300.

The trusted execution environment may generate a transaction including a data request QUE2.

The device for data storage 200 may acquire the recorded encryption key together with the data request QUE2 of the trusted execution environment from the blockchain and encrypt the data stored therein using the encryption key. The device for data storage 200 may generate a transaction including a hash value of the encrypted data and record it in the blockchain BC to provide the data encrypted with the hash value to the trusted execution environment.

The trusted execution environment may perform processing on the data collected from the device for data storages 200 when the data is consistent with the criteria required for the data processing. Since data acquired from the blockchain BC is encrypted with the public key of the trusted execution environment, the trusted execution environment may decrypt the hash value DAT of the encrypted data with a private key and perform the data processing according to the data processing code.

When the data processing is completed, the trusted execution environment may encrypt a data processing result using a public key of the client device 300 and return the encrypted data processing result RES to the blockchain.

The smart contract between the data processing platform server 100 and the client device 300 is terminated when the data processing result that is consistent with the data processing request QUE1 is returned. The trusted execution environment may verify that the enforcement of the smart contract has been completed by checking whether the data processing result is recorded on the blockchain.

When the data processing result is returned and the smart contract is terminated, the trusted execution environment running on the data processing platform server 100 enters a self-destroy mode. As the trusted execution environment is caused to be self-destroyed, the data received from the device for data storage 200 for the data processing is also deleted from the data processing platform server 100.

The client device 300 may acquire the encrypted data processing result RES recorded on the blockchain BC, and decrypt the encrypted data processing result RES with the private key to acquire the data processing result that is consistent with the data processing request.

Figure 3:
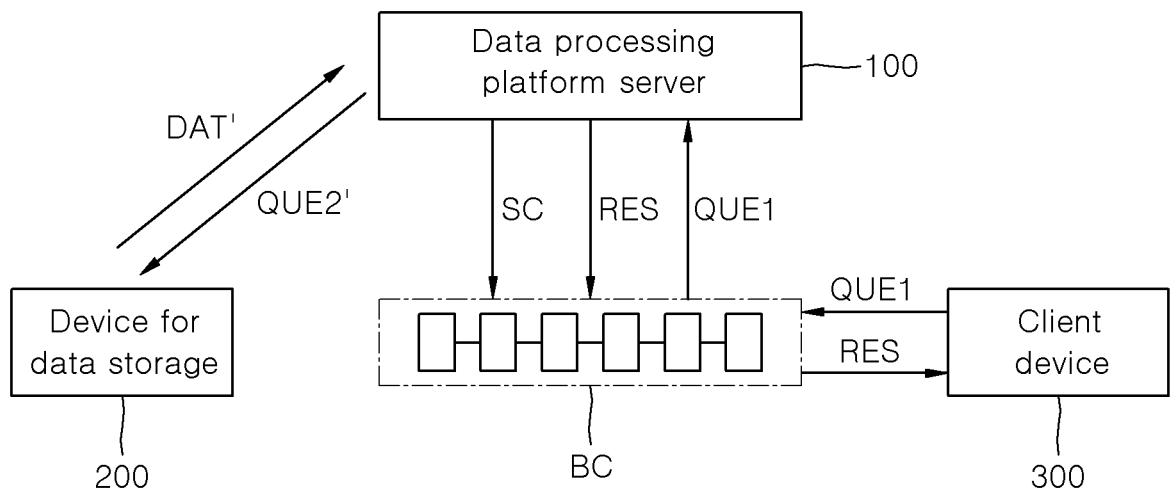
FIG. 3 is a diagram to illustrate a data processing method in a trusted execution environment using a smart contract, according to another embodiment of the present invention.

FIG. 3 is a diagram to illustrate a data processing method in a trusted execution environment using a smart contract, according to another embodiment of the present invention.

Referring to FIG. 3, the data processing platform server 100 may generate a smart contract SC for a data processing and distribute it to the blockchain BC, and the smart contract SC may be recorded in a block of the blockchain BC and executed on the blockchain BC. Here, the smart contract SC is automatically concluded when a transaction including a data processing request QUE1 consistent with a preset regulation from the client device 300 is provided to the blockchain BC, and is terminated when a data processing result consistent with the data processing request QUE1 is returned.

The client device 300 may provide the data processing request QUE1 consistent with the smart contract SC to the blockchain BC in order to acquire the data processing result.

When the smart contract SC is concluded between the data processing platform server 100 and the client device 300, the data processing platform server 100 generates a trusted execution environment containing a data processing code and an encryption key in response to the data processing request QUE1. Here, the data processing code may refer to a data processing model provided to the blockchain BC by the client device 300.

In order to perform a data processing corresponding to the data processing code, the trusted execution environment may make a data request QUE2' to the device for data storage 200 through a data processing platform. In other words, the Trusted Execution Environment may publicly perform the data request QUE2' for the collection of data through the data processing platform.

The device for data storage 200 may provide stored data DAT' to the data processing platform server 100 via a data processing platform in response to the data request QUE2'. In this case, the device for data storage 200 may encrypt the data DAT' with the encryption key of the trusted execution environment to provide only the hash value.

The trusted execution environment may perform processing on the data DATA' collected from the device for data storages 200 if the data is consistent with the criteria required for the data processing. The trusted execution environment may process the data (DAT') collected from the device for data storage 200 in accordance with the data processing code.

If the data DAT' collected from the device for data storages 200 is encrypted with the public key of the trusted execution environment, the trusted execution environment may decrypt the collected data DAT' with a private key and then perform the data processing according to the data processing code.

When the data processing is completed, the trusted execution environment may encrypt a data processing result using a public key of the client device 300 and return the encrypted data processing result RES to the blockchain.

The smart contract between the data processing platform server 100 and the client device 300 is terminated when the data processing result that is consistent with the data processing request QUE1 is returned. Accordingly, when the data processing result is returned and the smart contract is terminated, the trusted execution environment running on the data processing platform server 100 is caused to be self-destroyed. As the trusted execution environment is caused to be self-destroyed, the data received from the device for data storage 200 for the data processing is also deleted from the data processing platform server 100.

> the client device 300 may acquire the encrypted data processing result RES recorded on the blockchain BC, and decrypt the encrypted data processing result RES with the private key to acquire the data processing result that is consistent with the data processing request.

Figure 4:
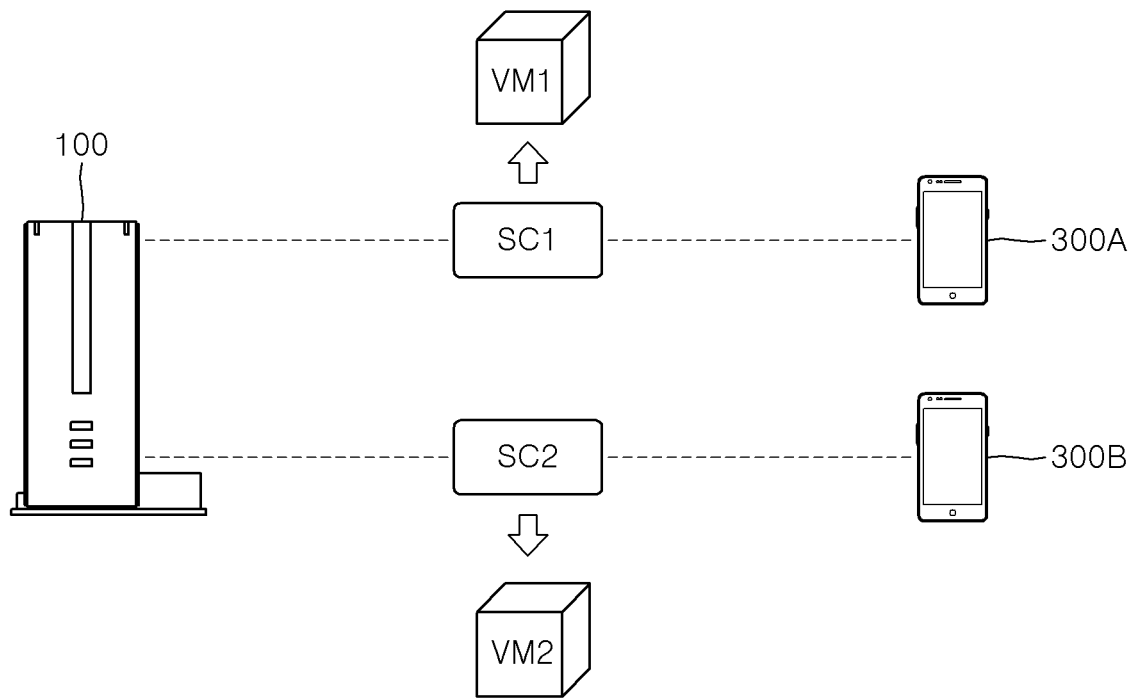
FIG. 4 is a diagram to illustrate a smart contract according to an embodiment of the present invention.

FIG. 4 is a diagram to illustrate a smart contract according to an embodiment of the present invention.

Referring to FIG. 4, the data processing platform server 100 may generate a smart contract for data processing, which may be distributed by the blockchain, and a trusted execution environment for data processing may be generated when the smart contract is signed with the client device 300.

The data processing platform server 100 may generate and distribute multiple smart contracts on the blockchain; and if a plurality of different data processing requests are made to a single smart contract, a plurality of different trusted execution environments may be generated.

The trusted execution environments generated for data processing may be a virtual execution environments, at least one of which may be generated by the data processing platform server 100 to enforce a smart contract. In other words, even if 10 smart contracts are distributed on the blockchain, if only 2 smart contracts are signed, the data processing platform server 100 may run 2 trusted execution environments to enforce the contracts.

In addition, since the smart contracts may be set differently in terms of whether the enforcement is completed normally for each smart contract, the enforcement period, the enforcement method, and the like, a series of processes in which each smart contract is generated and self-destroyed depending on whether the contract is concluded and enforced are performed independently.

For example, the data processing platform server 100 may enter into a first smart contract SC1 with a first client device 300A and a second smart contract SC2 with a second client device 300B. The data processing platform server 100 may generate a first trusted execution environment VM1 corresponding to the conclusion of the first smart contract SC1, and a second trusted execution environment VM2 corresponding to the conclusion of the second smart contract SC2. Even if there are smart contracts distributed on the blockchain other than the first and second smart contracts SC1 and SC2, the data processing platform server 100 runs the trusted execution environments only for the concluded smart contracts.

The first Trusted Execution Environment VM1 and the second Trusted Execution Environment VM2 are virtual machines generated based on different contract contents and run independently of each other, making it impossible for one Trusted Execution Environment to affect the other. Accordingly, even if the first trusted execution environment VM1 is caused to be self-destroyed due to the enforcement of the contract, the second trusted execution environment VM2 may not be affected and continue to perform a data processing process according to the content of the second smart contract SC2.

In this way, the data processing platform server 100 may enforce multiple smart contracts simultaneously by using the trusted execution environments that are executed independently for the respective smart contracts, and may prevent the risk of data leakage or mixing by using an independent data processing space that cannot be invaded.

Figure 5:
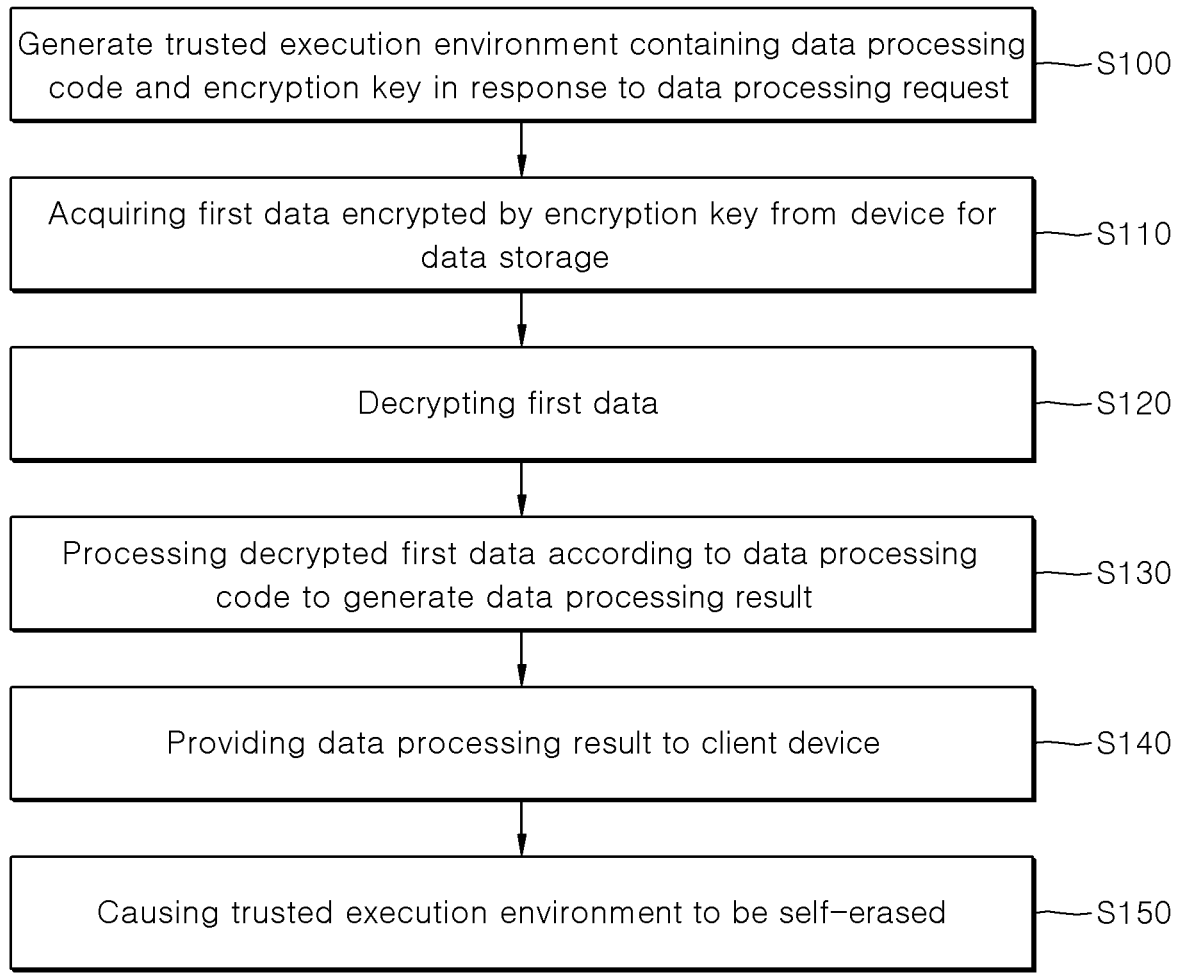
FIG. 5 is a flow diagram to illustrate a data processing method in a trusted execution environment using a smart contract according to an embodiment of the present invention.

FIG. 5 is a flow diagram to illustrate a data processing method in a trusted execution environment using a smart contract according to an embodiment of the present invention.

Referring to FIG. 5, in S100, a trusted execution environment running on the data processing platform server 100 may be generated in response to a data processing request received from the client device 300 according to a smart contract distributed on the blockchain BC, and may include a data processing code and an encryption key.

In S110, the trusted execution environment may then acquire first data encrypted by an encryption key from the device for data storage 200, such as by acquiring a hash value recorded on the blockchain BC as the first data or receiving the first data directly from the device for data storage 200 through the data processing platform.

And then, in S120, the trusted execution environment may decrypt the first data with a private key of the trusted execution environment.

Subsequently, in S130, the trusted execution environment may process the decrypted first data according to the data processing code to produce a data processing result.

Then, in S140, the trusted execution environment may provide an encrypted data processing result to the client device 300 by encrypting the data processing result using a public key of the client device 300 and returning it to the blockchain.

Thereafter, in S150, the Trusted Execution Environment may be caused to be self-destroyed by executing a self-destroy instruction when the enforcement of the smart contract is completed.

The steps of the methods or algorithms described in connection with the embodiment of the present invention may be implemented directly in hardware, implemented as software modules executed by hardware, or by a combination thereof. The software module may reside in a random access memory (RAM), a read only memory (ROM), an erasable programmable ROM (EPROM), an electrically erasable programmable ROM (EEPROM), a flash memory, a hard disk, a removable disk, a CD-ROM, or any other form of computer readable recording medium well known in the art to which the present invention belongs.

Although the embodiments of the present invention have been described above, it will understood that those skilled in the art to which the present invention belongs may make and practice various modifications without departing from the scope of the claims of the present invention.

INDUSTRIAL AVAILABILITY

According to the present invention, it is possible to prevent the collected data from being leaked to the outside and to fundamentally block the viewing of the data by the operating entity, thereby protecting the privacy of the data subject by In addition, according to the present invention, multiple smart contracts may be enforced simultaneously, the collected data may be guaranteed to be securely deleted without being leaked to the outside, and the privacy of the entities that provided the data may be securely protected because the data required for data processing is not provided directly to the data processing requester.

The invention claimed is:

1. A data processing method in a trusted execution environment, the method comprising:
generating, by a data processing platform server, the trusted execution environment containing a data processing code and an encryption key in response to a data processing request received from a client device according to a smart contract distributed on a blockchain;
acquiring, by the trusted execution environment, first data encrypted by an encryption key from a device for data storage;
decrypting, by the trusted execution environment, the first data;
processing, by the trusted execution environment, the decrypted first data according to the data processing code to produce a data processing result;
providing, by the trusted execution environment, the data processing result to the client device;
causing, by the data processing platform server, the trusted execution environment to be self-destroyed according to the smart contract,
wherein the causing to be self-destroyed according to the smart contract includes:
executing a self-destroy instruction; and
causing the trusted execution environment including the data processing code and the decrypted first data to be self-destroyed.

2. The data processing method of claim 1, wherein said generating the trusted execution environment includes:
generating a raw trusted execution environment with no arbitrary data processing code and no encryption key generated; and
generating, based on the raw trusted execution environment, the trusted execution environment containing the data processing code and the encryption key corresponding to the data processing request.

3. The data processing method of claim 2, wherein said generating the raw trusted execution environment includes:
generating a first image executable file of the raw trusted execution environment, generating a first hash value for the first image executable file, and generating a transaction including the first hash value to record it on the blockchain.

4. The data processing method of claim 2, wherein said generating the trusted execution environment containing the data processing code and the encryption key corresponding to the data processing request includes:
generating a second image executable file of the trusted execution environment, generating a second hash value for the second image executable file, and generating a transaction containing the second hash value to record it on the blockchain.

5. The data processing method of claim 1, further comprising:
after said providing the data processing result to the client device, verifying, by the trusted execution environment, that the enforcement of the smart contract has been completed.

6. The data processing method of claim 1, wherein the trusted execution environment maintains its validity only as long as the smart contract lasts.

7. The data processing method of claim 1, wherein the trusted execution environment uses the smart contract that is a virtual execution environment.

8. The data processing method of claim 1, wherein at least one trusted execution environment is generated to enforce the smart contract in the data processing platform server.

9. The data processing method of claim 1, wherein the encryption key is an asymmetric key comprised of a pair of a private key and a public key of the trusted execution environment.

10. The data processing method of claim 9, wherein the encrypted first data is one that is encrypted with the public key of the trusted execution environment.

11. The data processing method of claim 1, wherein said providing to the client device includes:
providing the data processing result to the client device by encrypting the data processing result using a public key of the client device and returning the data processing result to the blockchain.

12. The data processing method of claim 1, wherein the executing the self-destroy instruction includes:
generating a flag indicating the execution of the self-destroy instruction, and then generating a transaction including the flag to record the flag on the blockchain.

13. The data processing method of claim 12, further comprising scanning, by a data storage device, the blockchain to check the flag indicating the execution of the self-destroy instruction recorded on the blockchain to verify that the trusted execution environment including the data processing code and the decrypted first data has been securely deleted.

14. A non-transitory computer-readable storage medium storing one or more programs, wherein the one or more programs are configured to be executed by one or more processors of an electronic device, the one or more programs comprising instructions for performing the method of claim 1.

* * * * *